Nov. 1, 1932.  W. S. DAVENPORT  1,885,236
FRICTION CLUTCH
Filed Sept. 14, 1928    3 Sheets-Sheet 2
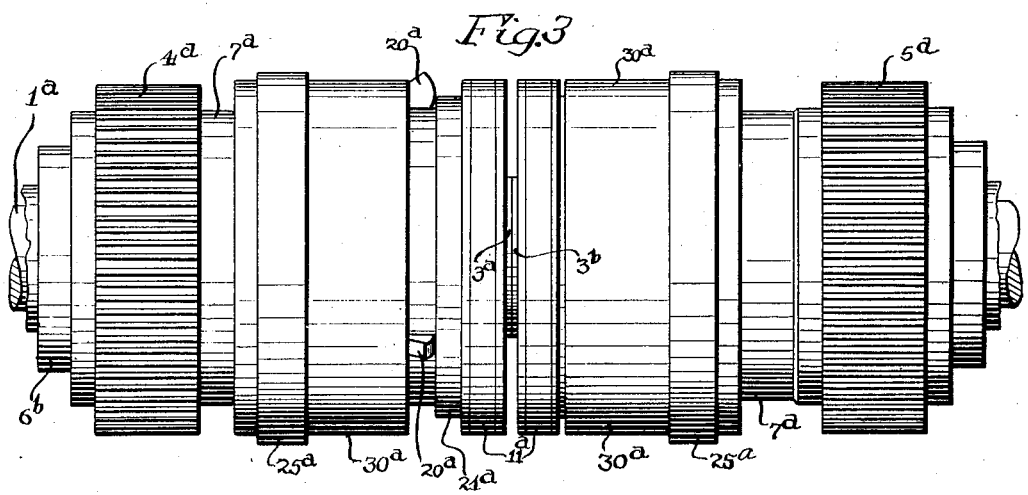
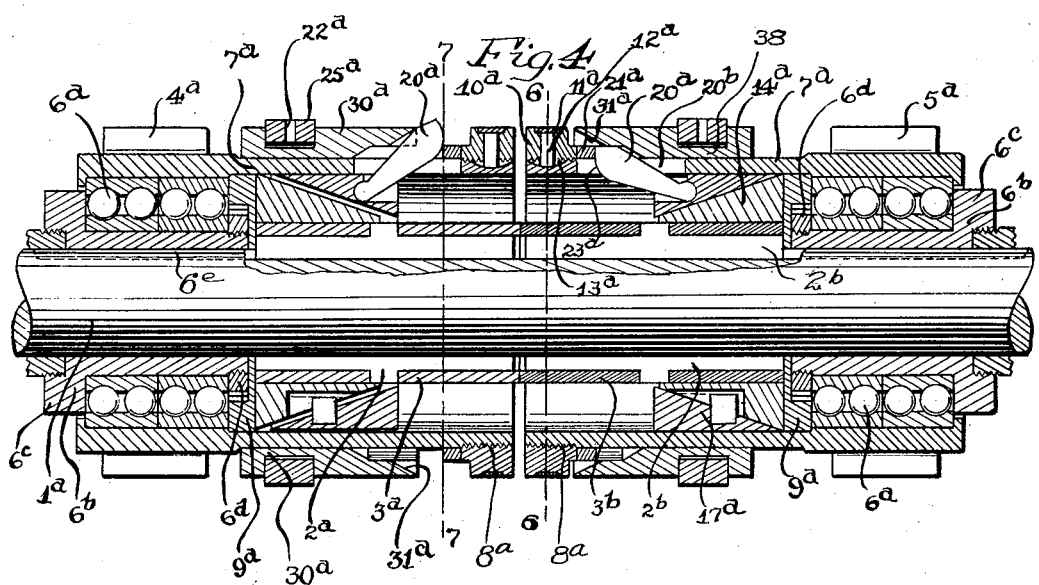
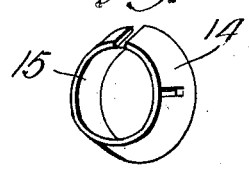
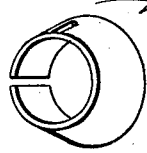
INVENTOR
William S. Davenport
BY
his ATTORNEY Nov. 1, 1932. W. S. DAVENPORT 1,885,236
FRICTION CLUTCH
Filed Sept. 14, 1928  3 Sheets-Sheet 3
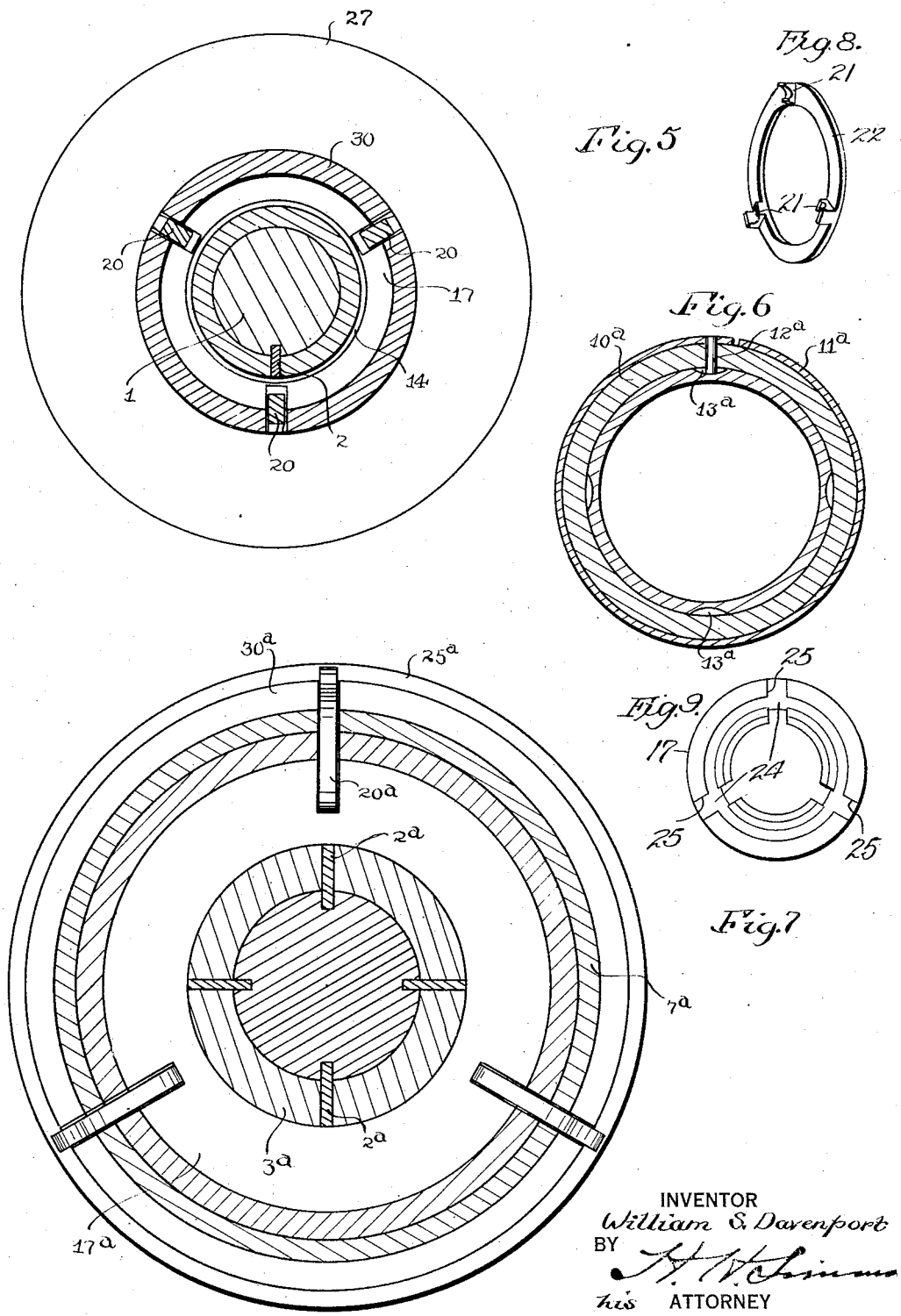
INVENTOR
William S. Davenport
BY
his ATTORNEY Patented Nov. 1, 1932

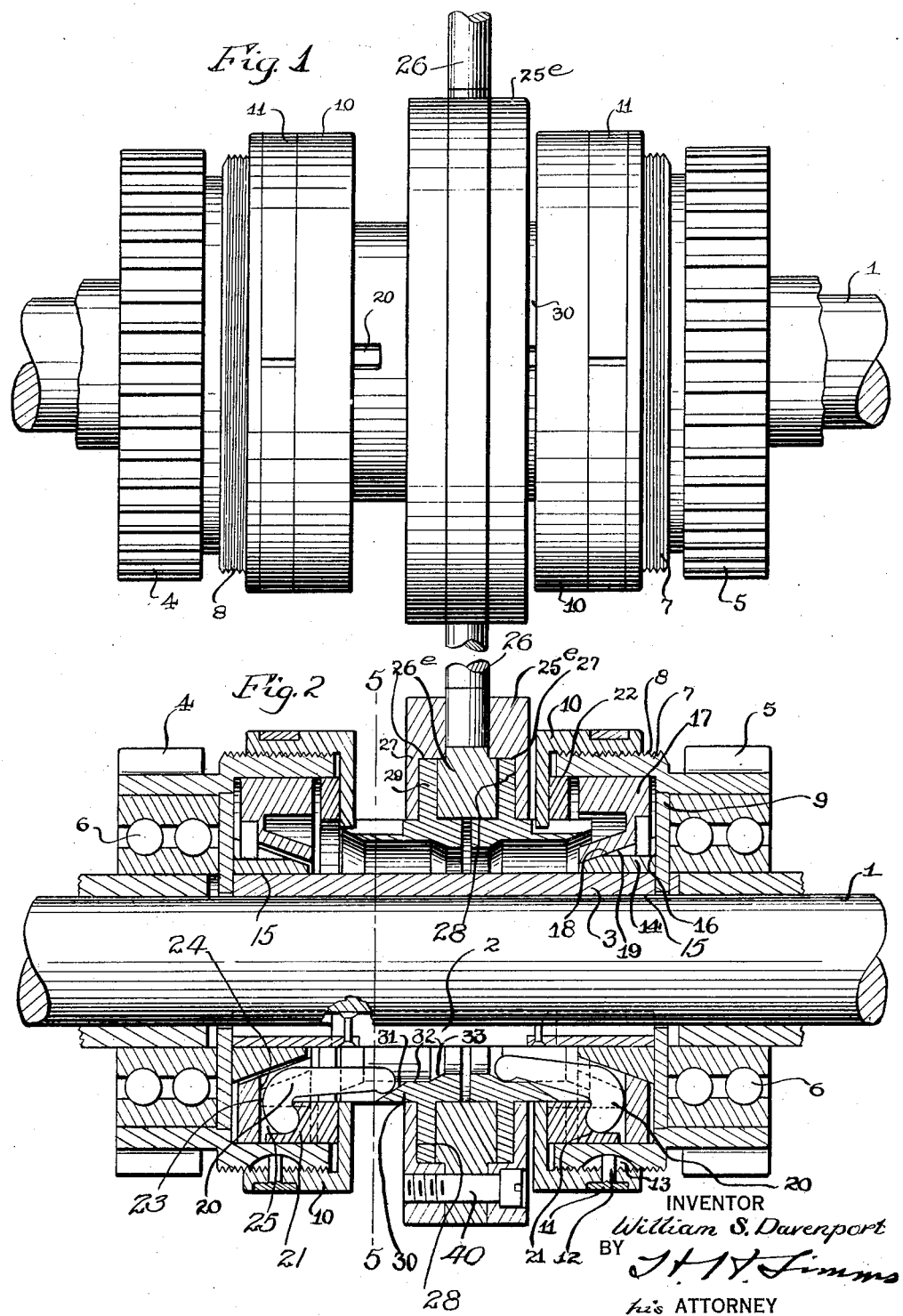

1,885,236

UNITED STATES PATENT OFFICE

WILLIAM S. DAVENPORT, OF ROCHESTER, NEW YORK, ASSIGNOR TO DAVENPORT MACHINE TOOL CO., INC., OF ROCHESTER, NEW YORK, A CORPORATION

FRICTION CLUTCH

Application filed September 14, 1928. Serial No. 305,974.

The present invention relates to friction clutches and an object thereof is to so construct the clutch parts that the driven member can be stopped, started or reversed with the least possible energy and without at the same time generating an excessive or destructive amount of heat. Another object of the invention is to provide a clutch member in the form of a cylinder of small uniform diameter, thus doing away with a large mass of metal which has been heretofore employed. A still further object of the invention is to provide a clutch member having a small mass combined with clutch operating parts under continuous rotation by the driving parts.

To these and other ends, the invention consists of certain parts and combinations of parts all of which will be hereinafter described: the novel features being pointed out in the appended claims.

In the drawings:

Fig. 1 is a side view of the clutch constructed in accordance with this invention;

Fig. 2 is a sectional view on two radii at right angles to each other;

Fig. 3 is a side view of another embodiment of the invention;

Fig. 4 is a sectional view on two radii at angles to each other;

Fig. 5 is a section on the line 5—5, Fig. 1;

Fig. 6 is a detail sectional view on the line 6—6, Fig. 4;

Fig. 7 is a section on the line 7—7, Fig. 4.

Fig. 8 is a perspective view of the ring carrying the projecting cam seats;

Fig. 9 is a plan view of the compression ring;

Fig. 10 is a perspective view of the split clutch ring used in the preferred form of this invention.

Fig. 11 is a perspective view of the split clutch ring used in the modification.

In the embodiment illustrated in Figs. 1 and 2, 1 indicates the shaft to be driven having keyed thereto at 2 a driven clutch member 3 in the form of a sleeve or cylinder of uniform diameter throughout and having a minimum amount of metal therein, in this instance, closely fitting the shaft 1.

In this embodiment, the driving members 4 and 5 in the form of gears are employed one turning in one direction and the other turning in the opposite direction, or both may turn in the same direction. These gears are mounted to turn on the shaft 1 and to this end have ball bearings 6 interposed between them and the shaft. Each gear also has an annular flange 7 provided with external threads 8 and projected from one side of the gear to provide a housing on the inner side of the ball bearing 6 and a disk 9 having a tight fit with the flange to one side of the gear, separating the ball bearing from the housing. Arranged to operate on the screw threads 8 is a combined closure and adjusting member 10 having an opening through which the shaft 1 projects and a flanged portion internally threaded and engaging the screw threads 8. A split ring 11 is arranged in an external groove in the flanged portion of the closure member 10 and has a pin 12 which is adapted to enter one of the series of notches 13 formed in the periphery of the housing flange 7 in order to lock the closure 10 in its adjusted position. Within the housing flange 7 is arranged a split clutch ring 14 which surrounds the clutch member 3 and has an internal face 15 conforming to the circumference of the clutch member 3 adjacent an end of the latter. This clutch ring 14 also has a face 16 which is adapted to cooperate with the disk or ring 9. Normally the sleeve 3 turns in this ring and in order to produce a binding or friction contact between the ring 14 and the clutch sleeve 3, a compression member 17 is provided mounted within the housing flange 7 to turn with the latter and having a tapered bore 18 which corresponds with the taper of the outer face 19 of the clutch ring 14. This compression ring 17 is axially movable, its movement being effected, in this instance, by a plurality of cam levers 20 fulcrumed on projecting seats 21 on a ring 22 which is also mounted in the housing flange 7 to turn with the latter. Each cam lever has a cam surface 23 adapted to cooperate with a surface 24 on the compression ring 17, the compression ring having notches or grooves 25 in which the cam levers lie. The ring 22 which supports the cam levers 20 is adjustable to increase or decrease the power of said levers by adjusting the adjusting member 10.

With the end in view of connecting either of the clutch rings 14 with the clutch sleeve 3, a common controlling member is provided surrounding the shaft 1 between the two clutch rings 14 and moved axially through a yoke not shown, pivotally connected with trunnions 26 projected from opposite sides of the controlling member. This controlling member embodies, in this instance, three separate rings $25^e$, $26^e$ and 27 held together by bolts 40 adjacent their outer peripheries and spaced apart adjacent their inner peripheries to provide between them two bearing grooves 28 for annular flanges 29 on two cam rings 30 which project in opposite directions from the controlling member and are guided in the two cover members 10. Each cam ring has a plurality of cam surfaces each comprising portions 31, 32 and 33, each series surface cooperating with one of the cam levers 20.

When the controlling member is moved in one direction, say toward the position shown in Fig. 2, the cam levers 20 nearest the gear 5 will ride on the cam surfaces of the adjacent cam 31 and such levers 20 will be turned so as to force the compression ring 17 outwardly, thus compressing the clutch ring 14 on the clutch sleeve 3. At the same time, the other cam 31 moves away from the gear 4 permitting the levers 20 nearer the gear 4 to swing outwardly by centrifugal force in order that the compression member 17 controlled by said levers may release the clutch member 14 nearer the gear 4. In this way, the shaft 1 will be turned by the gear 5 while the mechanism driving the gear 4 will have no action on the latter. Of course when the controlling member is moved in the other direction, the parts operate in the reverse direction connecting the gear 4 to the shaft 1 and disconnecting the gear 5 from the shaft 1.

In the embodiment of the invention shown in Figs. 3 and 4 the driving members are indicated at $4^a$ and $5^a$ in the form of gears surrounding a driven shaft $1^a$ upon which two sleeves $3^a$ and $3^b$ are arranged, said sleeves being keyed to the shaft $1^a$ by keys $2^a$ and $2^b$ respectively. The gears $4^a$ and $5^a$ each have a laterally projecting housing $7^a$ extending one toward the other. Each gear is supported on the shaft $1^a$ by two ball bearing rings $6^a$ which are arranged on the collar $6^b$ between a fixed abutment $6^c$ and a movable ring abutment $6^d$, the collar $6^b$ being keyed at $6^e$ to the shaft $1^a$. The housing extension $7^a$ is divided into two parts by an annular partition $9^a$ which is connected to the housing and turns with the latter. The bearings $6^a$ are located on one side of this partition with the collar $6^b$ while on the opposite side is positioned the sleeve $3^a$ or $3^b$ which is surrounded substantially throughout its length by said extension $7^a$ in spaced relation to the extension. In this space is arranged a split friction ring or clutch ring $14^a$ which fits about the cylindrical clutch member $3^b$ but turns with the housing. The clutch ring $14^a$ frictionally engages the partition $9^a$ and has a tapered face adapted to be engaged by the tapered face of a compression ring $17^a$. The latter is movable axially of the shaft $1^a$ preferably by cam levers $20^a$ which operate in slots $20^b$ in the housing $7^a$ and which engage an adjustable abutment ring $21^a$ adjustable on the housing $7^a$ and cooperating with the cam surface $23^a$ on each of the levers $20^a$. Adjustment of the abutment ring $21^a$ may be adjusted by an adjusting ring $10^a$ which is internally threaded and engages an externally threaded portion $8^a$ on the housing $7^a$. The adjusting ring $10^a$ has a surrounding groove in which a split ring $11^a$ is received, this split ring $11^a$ having a locking pin $12^a$ which passes through the adjusting ring $10^a$ into one of a series of locking notches $13^a$ formed in the housing. By adjusting the position of the ring $10^a$ on the housing $7^a$, the abutment $21^a$ shifts and causes the action of the cam levers $20^a$ to be increased or decreased on the compression ring $17^a$.

In this embodiment of the invention, the two sets of cam levers are controlled by independently movable cam rings $30^a$ which are mounted to slide on the external face of the two housings $7^a$ in order to cause their cam surfaces $31^a$ to cooperate with the cam levers $20^a$. Each cam ring $30^a$ is, in this instance, surrounded by a controlling ring $25^a$ which operates in a groove in said cam member and is controlled by a controlling yoke engaging the yoke openings $22^a$ in said ring.

Prior to this invention, friction clutches have had the parts for operating the clutch built into the part which starts or stops or reverses according to the use of the clutch. This has necessitated the starting, stopping or reversing of a considerable mass of metal, thus producing a waste of power at high speed, a tendency to wear out the clutch and also the generation at very high speeds of an excessive or destructive amount of heat due to friction created by the starting and stopping or reversing of this mass. According to this invention, the operating mechanism for the clutch is mounted to turn with the driving member so as to be under continuous rotation, and, in addition, the clutch element on the driven part is a plain round cylinder of small diameter which can be stopped, started or reversed with the least possible energy and yet may be gripped with a sufficient power for all practical purposes.

What I claim as my invention and desire to secure by Letters Patent is:

1. The combination with a driving member and a driven clutch member having a surrounding external clutch face, of a compressible clutch ring surrounding the driven clutch member and having an internal clutch face for engaging the clutch face of the driven clutch member, said compressible clutch ring also having a tapering outer face, an annular axially movable compression member having a tapering face for cooperatng with the tapering face of the compressible clutch member to force the latter into engagement with the driven clutch member, and means connecting the compression member to the driving member independently of the compressible member to drive the compression member from the driving member.

2. The combination with a driven clutch member having a surrounding clutch face, of a compressible clutch ring surrounding the driven clutch member and having a face for engaging the clutch face of the driven clutch member, means for driving said compressible clutch ring about the driven clutch member, an axially movable annular compression member for compressing the compressible clutch ring into clutching engagement with the driven clutch member, cam levers for moving said axially movable compression member axially, and an axially movable cam member for shifting said clutch levers to cause the compression member to move axially to compress the compressible clutch ring upon the driven clutch member.

3. The combination with a driven clutch member having a surrounding clutch face, of a compressible clutch ring surrounding the driven clutch member and having a face for engaging the clutch face of the driven clutch member, means for driving said compressible clutch ring about the driven clutch member, an axially movable annular compression member for compressing the compressible clutch ring into clutching engagement with the driven clutch member, cam levers for moving said axially movable compression member axially, an axially movable cam member for shifting said clutch levers to cause the compression member to move axially to compress the compressible clutch ring upon the driven clutch member, and means for adjusting the action of said cam levers on said compression member to increase or decrease the compression action of the compression member on the compressible clutch face.

4. A clutch comprising a driven shaft, a clutch member secured to the driven shaft, a driving member mounted to turn on said driven shaft, a compressible clutch member surrounding the clutch member and turning with the driving member, and means turning with the driving member engaging about the periphery of the compressible clutch member for compressing the compressible clutch member on the first mentioned clutch member and means connecting the compression means for the compressible clutch member to the driving member independently of the compressible member to drive the compression member from the driving member.

5. A clutch comprising a shaft, a clutch member secured to the shaft, a driving member mounted on the shaft and having a flange surrounding said clutch member, a compressible ring surrounding the clutch member within the flange and turning with the latter, an axially movable compression ring for compressing the compressible ring into engagement with the clutch member, a plurality of cam levers cooperating with said compression ring and supported by the flange, and an axially movable cam ring for moving said levers.

6. The combination with a driven shaft, of a driver supported entirely by and mounted to turn on the driven shaft, a clutch member turning with the driven shaft, a floating compressible clutch ring surrounding said clutch member for compression upon the first named clutch member, and compression means supported entirely by the driver for compressing the compressible clutch ring on the first named clutch member.

7. The combination with a driven shaft, of a driving member supported entirely by and turning on the driven shaft, a cylindrical clutch member on the driven shaft, a housing carried by the driving member and extending over the cylindrical clutch member, a clutch shifting ring guided longitudinally of the shaft on the exterior of the housing, a compressible clutch ring mounted within the housing, and means carried by the housing for compressing said clutching ring upon the cylindrical clutching member.

8. The combination with a driven member and a driver supported by and turning on said driven member, of a cylindrical clutch member mounted to one side of the driver and turning with the driven member, an annular compressible clutch member surrounding said cylindrical clutch member and compressible thereon, and means turning with and entirely supported by the driver and movable into and out of compressible relation to the annular clutch member.

9. The combination with a driven shaft, of a cylindrical clutch member turning with the shaft, two driving gears mounted to turn on the shaft at opposite ends of the cylindrical clutch member, and each having a housing projecting over said cylindrical clutch member, two compressible clutching rings surrounding the cylindrical clutch member, each within one of the housings, and means supported entirely by the housings for compressing either of said clutch rings upon the cylindrical clutch member.

10. The combination with a driven shaft having a small cylindrical clutch face, of a driving gear mounted to turn on the shaft to one side of said clutch face, a housing turning with the gear and extending over said cylindrical clutch face, a compressible clutch member surrounding the cylindrical clutch face within said housing and having a tapered external face, and a member movable axially of the shaft, mounted to turn with the housing and cooperating with the tapered face of the compressible clutch member to compress the same on the cylindrical clutch member to cause the shaft to turn with the driving gear.

11. The combination with a driven shaft, of a driver mounted to turn thereon, a clutch member turning with the driven shaft having a cylindrical clutching face, a compressible clutch ring having an internal cylindrical face for cooperating with the cylindrical face of the first mentioned clutch member and also having an external tapered face, an axially movable ring carried by the driver and movable into and out of engagement with the tapered face of the compressible clutch ring.

12. The combination with a driving member and a driven member, one of which has an external cylindrical clutch surface, of a floating ring shaped compressible member surrounding said cylindrical surface and having an internal cylindrical surface engaging with said external cylindrical surface, and an external surrounding tapered surface, an axially movable compression member having an internal tapered face engaging the external tapered face of the compression member, and driving connecting means between said compression member and the other of the first two named members not provided with the cylindrical clutch face.

13. The combination with a driven member in the form of a shaft having a clutching element turning therewith, of a driving member having a portion surrounding and enclosing the clutching element, a shifter movable axially of said driving member on said housing and turning therewith, a clutching element turning with the driving member to cooperate with the clutching element of the driven member and enclosed in the housing, and camming means enclosed in the housing and interposed between the shifter and the clutching element turning with the driving member.

14. In a clutch, the combination with a driven member and a driver having a housing on one side thereof, of clutching elements, one connected with the driver and the other connected with the driving member and both arranged in the housing, an axially movable shifter mounted on the housing, and camming means carried by the housing and operated by the shifter to effect clutching relation between the clutching elements.

15. In a clutch, the combination with a driver and a driven shaft having a surrounding clutch face, of a compressible ring surrounding said clutch face and having an external conical clutch face, an axially movable compression ring having a corresponding internal conical clutch face for engaging the conical face of the compressible ring, a series of movable cams for effecting the movement of said movable clutch ring, and a sliding ring for actuating the cams.

WILLIAM S. DAVENPORT.